United States Patent
Rutz et al.

(10) Patent No.: US 9,338,464 B2
(45) Date of Patent: May 10, 2016

(54) ADAPTIVE FIELD AND FRAME IDENTIFICATION

(71) Applicant: Cable Television Laboratories, Inc., Louisville, CO (US)

(72) Inventors: Gregory Rutz, Arvada, CO (US); Arianne Hinds, Louisvill, CO (US); Stephen Glennon, Lafayette, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 207 days.

(21) Appl. No.: 14/172,796

(22) Filed: Feb. 4, 2014

(65) Prior Publication Data

US 2015/0222909 A1    Aug. 6, 2015

(51) Int. Cl.
*H04N 19/167* (2014.01)
*H04N 19/172* (2014.01)
*H04N 19/174* (2014.01)
*H04N 19/196* (2014.01)
*H04N 19/70* (2014.01)
*H04N 19/103* (2014.01)

(52) U.S. Cl.
CPC ........... *H04N 19/167* (2014.11); *H04N 19/103* (2014.11); *H04N 19/172* (2014.11); *H04N 19/174* (2014.11); *H04N 19/196* (2014.11); *H04N 19/70* (2014.11)

(58) Field of Classification Search
CPC . H04N 19/167; H04N 19/172; H04N 19/103; H04N 19/196; H04N 19/70; H04N 19/174
USPC ................................. 375/240.02, 240.12
See application file for complete search history.

(56) References Cited

U.S. PATENT DOCUMENTS

| | | | | |
|---|---|---|---|---|
| 2005/0123207 | A1* | 6/2005 | Marpe ................. | H04N 19/196 382/239 |
| 2012/0183079 | A1* | 7/2012 | Yoshimatsu ........... | H04N 19/44 375/240.25 |
| 2014/0314147 | A1* | 10/2014 | Rusanovskyy ....... | H04N 19/517 375/240.12 |
| 2015/0189298 | A1* | 7/2015 | Ye ........................ | H04N 19/196 375/240.02 |
| 2015/0201204 | A1* | 7/2015 | Chen ..................... | H04N 19/33 375/240.02 |

OTHER PUBLICATIONS

Series H: Audiovisual and Multimedia Systems Infrastructure of audiovisual services—Coding of moving video High efficiency video coding.
Overview of the High Efficiency Video Coding (HEVC) Standard.

* cited by examiner

*Primary Examiner* — Christopher S Kelley
*Assistant Examiner* — Zhihan Zhou
(74) *Attorney, Agent, or Firm* — Great Lakes Intellectual Property, PLLC.

(57) ABSTRACT

Adaptively indicating field and frame encoding of coded pictures, such as but not necessarily limited to those transmitted in accordance with High Efficiency Video Coding (HEVC) (ISO/IEC 23008-2)/ITU-T Recommendation H.265, is contemplated. The field and frame encoding indications may be provided at various levels of granularity, such as on a per picture basis, a per slice basis and/or a per slice segment basis.

20 Claims, 5 Drawing Sheets

| aff | |
|---|---|
| 00 | Disabled |
| 01 | Picture Adaptive |
| 10 | Slice Adaptive |
| 11 | Slice Segment Adaptive |

| field | |
|---|---|
| 0 | Frame |
| 1 | Field |

| tff | |
|---|---|
| 0 | Bottom First |
| 1 | Top First |

ADAPTIVE FIELD AND FRAME IDENTIFICATION

TECHNICAL FIELD

The present invention relates to encoding/decoding pictures, such as but not necessarily limited to facilitating encoding/decoding pictures encoded based at least in part on the High Efficiency Video Coding (HEVC) (ISO/IEC 23008-2)/ITU-T Recommendation H.265 when some of the pictures are encoded as fields and some are encoded as frames.

BACKGROUND

The High Efficiency Video Coding (HEVC) (ISO/IEC 23008-2)/ITU-T Recommendation H.265 notes that it has been jointly developed by ITU-T Video Coding Experts Group (VCEG) and the ISO/IEC Moving Picture Experts Group (MPEG) in response to a growing need for higher compression of moving pictures for various applications such as videoconferencing, digital storage media, television broadcasting, internet streaming, and communications. It is also designed to enable the use of the coded video representation in a flexible manner for a wide variety of network environments as well as to enable the use of multi-core parallel encoding and decoding devices. The recommendation is designed to cover a broad range of applications for video content including but not limited to the following: broadcast (cable TV on optical networks/copper, satellite, terrestrial, etc.); camcorders; content production and distribution; digital cinema; home cinema; Internet streaming, download and play; medical imaging; mobile streaming, broadcast and communications; real-time conversational services (videoconferencing, videophone, telepresence, etc.); remote video surveillance; storage media (optical disks, digital video tape recorder, etc.); and wireless display.

A large proportion of digital video today is still created and distributed in interlaced format (usually at a higher framerate—60 Hz/50 Hz as oppose d to 30 Hz/25 Hz). The current version (1.0) of the HEVC (ISO/IEC 23008-2)/ITU-T Recommendation H.265 specification only provides minimal support for interlace tools, e.g., only entire Coded Video Sequences (CVS) can be selected as coded in field or frame mode. This leaves much to be desired in terms of the encoder's flexibility to identify pictures or sequences of pictures that, when coded as fields, can reduce the number of bits in the output stream as well as the objective quality of the video upon decode. Accordingly, one non-limiting aspect of the present invention contemplates facilitating identification of field and frame coded pictures in a manner that provides flexibility and granularity, such as to facilitate capitalizing on coding benefits associated therewith.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figures 1, 4:
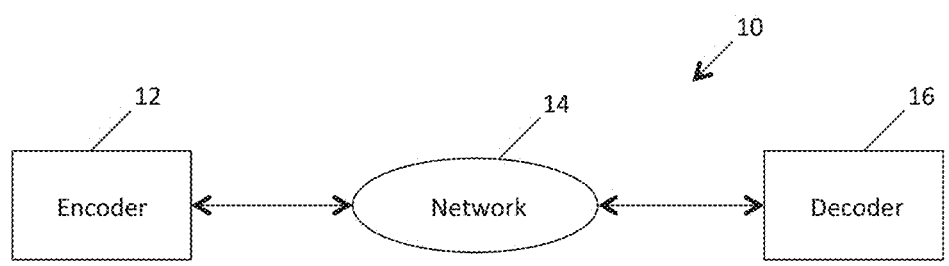
FIG. 1 illustrates a system for transporting coded pictures in accordance with one non-limiting aspect of the present invention.
FIG. 4 illustrates syntax tables in accordance with one non-limiting aspect of the present invention.

FIG. 1 illustrates a system 10 for transporting coded pictures in accordance with one non-limiting aspect of the present invention. The system 10 illustrates an encoder 12 configured to encode pictures for transport over a network 14 to a decoder 16 configured to decode the coded pictures for output. The system 10 may encompass any number of environments where coded pictures or other coded content is transmitted from one location to another location. The coded pictures may correspond with those encoded, compressed or otherwise processed using HEVC or other suitable picture compression techniques. The present invention is predominately described with respect to facilitating transport of television content, such as but not necessary limited to MPEG formatted programs, movies, etc. transmitted from a headend or Internet Protocol (IP) source over a network (cable, cellular, optical, wireless, wireline or combination thereof) to a television, set-top box (STB), phone, tablet, etc. at one or more subscriber locations using HEVC. This exemplary description is not necessarily intended to be limiting as the operations and processes contemplated herein may be similarly beneficial in facilitating encoding/decoding of non-television related pictures where it may be beneficial to differentiate between pictures encoded as fields (interlaced) and those encoded as frames (progressive), particularly in an adaptive manner on a per picture, per slice or per slice segment basis.

Figure 2:
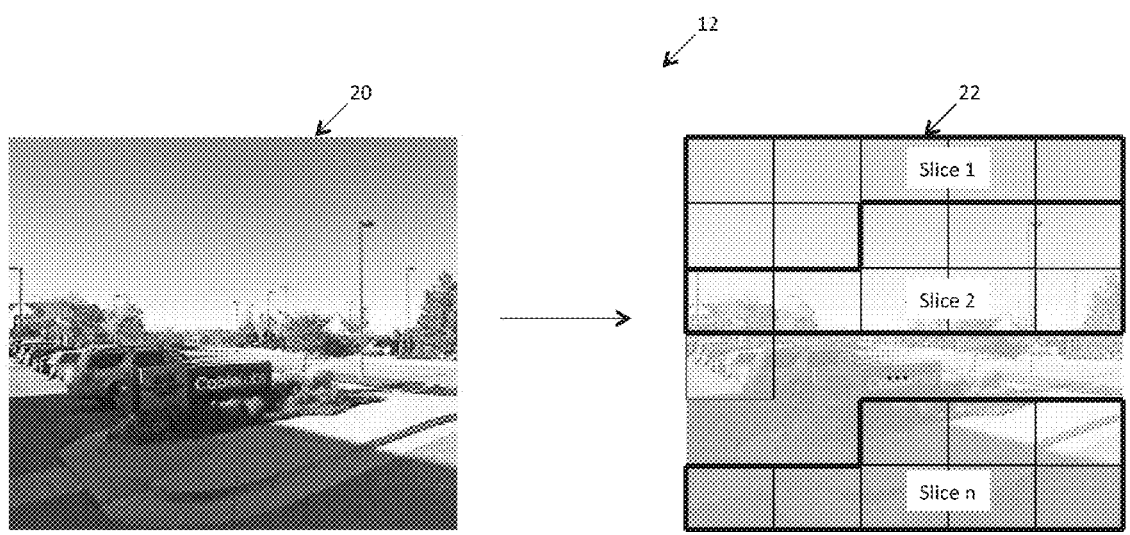
FIG. 2 illustrates an encoder encoding a picture in accordance with non-limiting aspect of the present invention.

FIG. 2 illustrates the encoder 12 encoding a picture in accordance with non-limiting aspect of the present invention. The encoding may be performed by the encoder 12 or other device having capabilities sufficient to facilitate enabling the syntax generation/insertion and other processes described herein to facilitate adaptively indicating field and framing encodings. The encoding is described with respect to the encoder 12 performing operations defined within HEVC to facilitate partitioning or otherwise reducing an input picture 20 into a plurality of slices (slice 1, sliced 2 ... slice n) and slice segments (each individual box within each slice is a slice segment) and tiles (not shown), collectively referred to as a coded picture 22, for transport and subsequent decode and/or re-construction with the decoder 16. One skilled in the art generally understands the process of partitioning an input picture into slices, slice segments, etc. and the details associated therewith can be found within the HEVC (ISO/IEC 23008-2)/ITU-T Recommendation H.265 specification, the disclosure of which is hereby incorporated by reference in its entirety. HEVC notes: a slice is a sequence of one or more slice segments starting with an independent slice segment and containing all subsequent dependent slice segments (if any) that precede the next independent slice segment (if any)

within the same access unit; a slice segment is a sequence of coding tree units, and likewise, a tile is a sequence of coding tree units; an independent slice segment is a slice segment for which the values of the syntax elements of the slice segment header are not inferred from the values for a preceding slice segment; and a dependent slice segment is a slice segment for which the values of some syntax elements of the slice segment header are inferred from the values for the preceding independent slice segment in decoding order.

Figure 3:
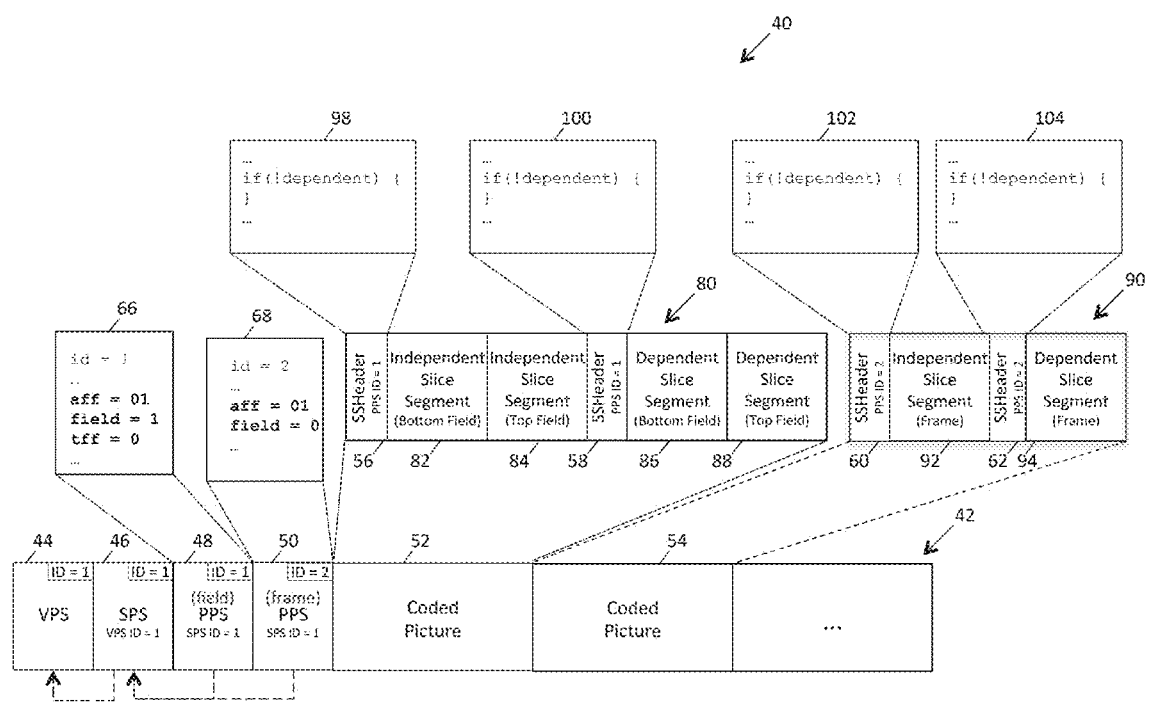
FIG. 3 illustrates a diagram for adaptively indicating field and frame encoding on a per picture basis in accordance with one non-limiting aspect of the present invention.

FIG. 3 illustrates a diagram 40 for adaptively indicating field and frame encoding on a per picture basis in accordance with one non-limiting aspect of the present invention. The diagram 40 illustrates a portion of a bitstream 42 transmitted in accordance with the HEVC Recommendation H.265 specification. The diagram 40 is shown for demonstration purposes and as such presents information representative of content, parameters and the like with out necessarily illustrating the entirety of the underlying details, values, syntax, etc. The bitstream 42 is shown to include a video parameter set (VPS) 44, a sequence parameter set (SPS) 46, two picture parameter sets (PPSs) 48, 50 and a plurality of coded pictures 52, 54. The VPS, SPS and PPSs 44, 46, 48, 50 are constructs well known to one skilled in the art and are particularly defined within the noted HEVC specification. The VPS 44 is defined as a syntax structure containing syntax elements that apply to zero or more entire coded video sequences (CVSs) as determined by the content of a syntax element found in the SPS 46 referred to by a syntax element found in the PPS 48, 50 referred to by a syntax element found in each slice segment header (SSH) 56, 58, 60, 62. The SPS 46 is defined as a syntax structure containing syntax elements that apply to zero or more entire CVSs as determined by the content of a syntax element found in the PPS 48, 50 referred to by a syntax element found in each slice segment header 56, 58, 60, 62. The PPS 48, 50 is defined as a syntax structure containing syntax elements that apply to zero or more entire coded pictures as determined by a syntax element found in each slice segment header 56, 58, 60, 62.

The VPS, SPS, and PPSs 44, 46, 48, 50 may be used to decouple transmission of infrequently changing information from the transmission of coded block data (coded pictures 52, 54), optionally with the VPSs, SPSs, and PPSs 44, 46, 48, 50, in some applications, being conveyed out-of-band (OOB). Each of the VPS, SPS and PPSs 44, 46, 48, 50 are shown to include an identification (ID) number to facilitate identifying referred to parameter sets, i.e., other parameter sets having information associated with decoding a similarly referred to one of the slice segments. A first PPS 48 is shown to include a parameter set for a field encoding and the second PPS 50 is shown to include a parameter set for a frame encoding. A first callout 66 and a second callout 68 are shown to illustrate syntax of the parameters respectively associated with the first and the second PPSs 48, 50. The parameters, values, and bits and other information comprising the syntax of the first and second PPSs 48, 50 may be rather lengthy and for illustrative purposes the first callout 66 is shown with abbreviated first (non-bolded) and second portions (bolded) and the second callout 68 is shown with similarly abbreviated third (non-bolded) and fourth portions (bolded). The first and third portions, or non-adaptive portions, may correspond with bits, fields, types and other syntactical constructs specified within HEVC for the PPS 48, 50 and the second and fourth portions, or adaptive portions, may correspond with syntactical constructs generated in accordance with the present invention, i.e., added to the HEVC PPS syntax.

One non-limiting aspect of the present invention contemplates indicating field and frame encoding within the adaptive portions, such as by specifying code sufficient to facilitate supplementing syntax included within an HEVC compliant PPS 48, 50. The adaptive portions are shown to include an adaptive field frame (aff) syntax, a field syntax and a top field first (tff) syntax. The aff syntax may be used to indicate whether the corresponding PPS 48, 50 identifies frame and field encoding on a per picture basis, per slice basis or per slice segment, which are respectively referred to herein as picture adaptive, slice adaptive and slice segment adaptive. The field syntax may be used to indicate whether the corresponding PPS 48, 50 includes a parameter set for frame encoding or field encoding, i.e., the values associated therewith maybe selected such that the field syntax identifies the corresponding parameter set to be associated with frame encoding or field encoding identification. The tff syntax may be an optional insert included to identify whether the field encoding is being performed as one of top field first or a bottom field (shown as bottom first and FIG. 3) when the field syntax indicates field encoding, i.e., the tff syntax may be omitted when the field syntax indicates frame encoding.

FIG. 4 illustrates an aff syntax table 74, a field syntax table 76 and a tff syntax table 78 in accordance with one non-limiting aspect of the present invention. These tables 74, 76, 78 include two-bit and single-bit, binary values to facilitate identifying which one of the available syntactical options are active for the corresponding PPS 48, 50. The aff, field, and/or tff syntaxes, which may be referred to interchangeably herein as the adaptive syntaxes, are shown for exemplary, non-limiting purposes with illustrative values and parameters and additional code, operands, logic and the like may also being included to facilitate the contemplated frame and field identifications. The placement of the adaptive syntax within the PPS 48, 50 may be dictated according to the logic and functions required of the PPS 48, 50 according to HEVC, which may require the adaptive syntax to be coded at an appropriate portion within the PPSs 48, 50, such as at an ending portion added after essentially all of the non-adaptive, HEVC specified syntax, e.g., following "pps_extension_data_flag" and before "rbsp_trailing_bits". Of course, the present invention is not necessary so limited and fully contemplates inserting the adaptive syntax at any suitable location and/or inserting the adaptive syntax at multiple locations within the same PPS 48, 50.

As shown in FIG. 3, a first slice 80 having a plurality of slice segments 82, 84, 86, 88 is shown to be included as part of the first coded picture 52 and a second slice 90 having a plurality of slice segments 92, 94 is shown to be included as part of the second coded picture 54. The number of slices 80, 90 and slice segments 82, 84, 86, 88, 92, 94 comprising each picture 52, 54 may be variable and is shown for illustrative purposes to include a limited number of slice segments 82, 84, 86, 88, 92, 94 as more may be included without deviating from the scope and contemplation of the present invention. Each slice segment 82, 84, 86, 88, 92, 94 is shown to be associated with a corresponding slice segment header 56, 58, 60, 62) having a PPS ID value set to one of the PPS ID values associated with a referred to PPS, which for exemplary purposes are shown to correspond with the first and second PPSs 48, 50. Header callouts 98, 100, 102, 104 are provided for each of the illustrated slice segment headers 56, 58, 60, 62 to represent syntax included therein, which when combined with the syntax included within the referred to one of the PPSs 48, 50 provides information to the decoder 16 to facilitate decoding of the corresponding slice segment 82, 84, 86, 88, 92, 94. The header callouts 98, 100, 102, 104 in this exemplary picture adaptive identification mode are shown to be comprised solely of non-adaptive syntax, i.e., syntax specified within HEVC.

The inclusion of the aff, field and/or tff syntaxes within the referred to one of the PPSs 48, 50 controls the field and frame encoding for the entire picture 52, 54 (each slice segment 82, 84, 86, 88, 92, 94) due to each slice segment header 56, 58, 60, 62 from the same picture 52, 54 being required to reference the same PPS 48, 50 in order to comply with HEVC. This provides the contemplated picture adaptive identification where syntax may be deterministically added to PPSs 48, 50 for use with identifying field or frame encoding of multiple slice segments 82, 84, 86, 88, 92, 94. The picture adaptive capabilities may be beneficial in enabling a single addition to be propagated through multiple slice segments 82, 84, 86, 88, 92, 94 without having to add corresponding bits to the referencing slice segment headers 56, 58, 60, 62. (The field coded slice segments are shown to include two slice segments—bottom and top—being associated with the same slice segment header as each may be considered as half of one slice segment.) The picture adaptive syntaxes may be selectively added to each PPS 48, 50 as needed and as a function of encoder partitioning of the corresponding picture 52, 54 so as to provide per picture identification of the field and frame encoding. The adaptive syntax may be varied from PPS 52 to PPS 54 such that one picture 52 may be identified as field with the next or immediately adjoining picture 54 in the bitstream 42 being identified as frame simply by varying the adaptive syntax added to the corresponding PPSs 52, 54.

Figure 5:
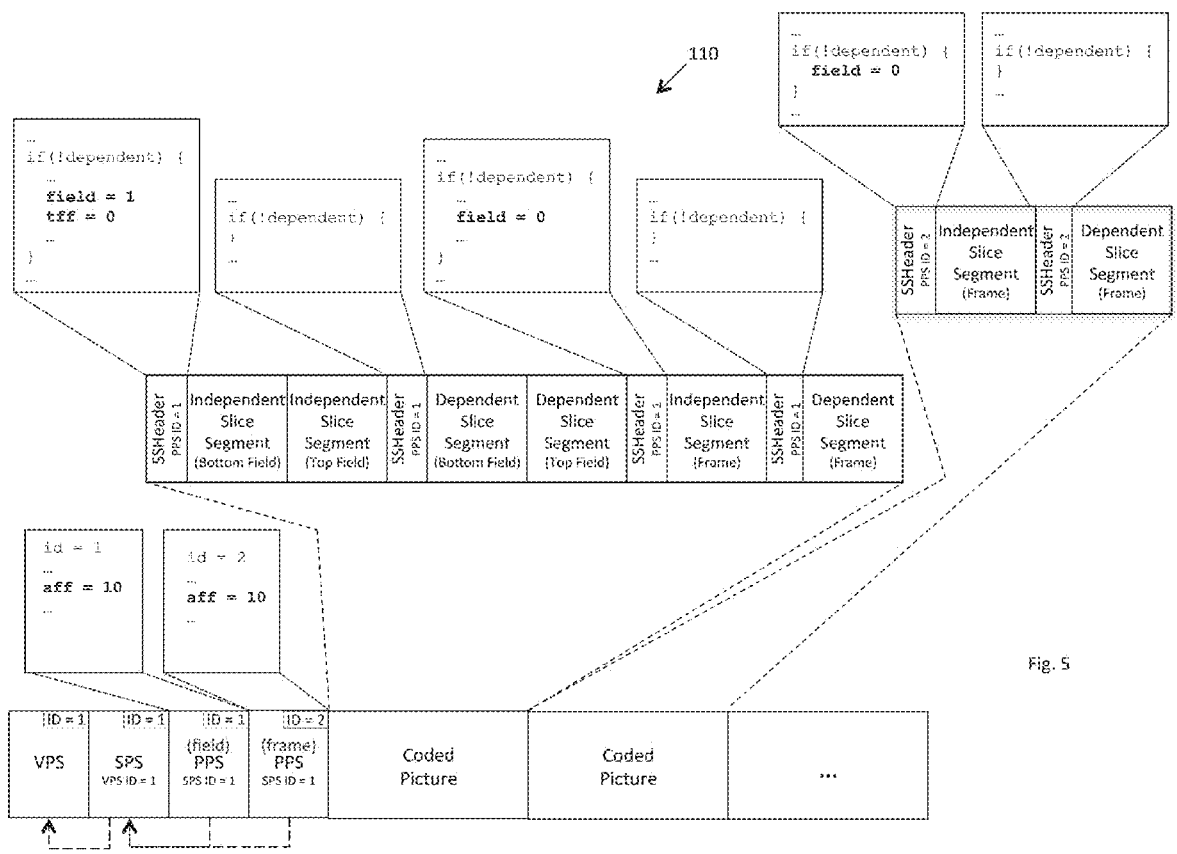
FIG. 5 illustrates a diagram for adaptively indicating field and frame encoding on a per slice basis in accordance with one non-limiting aspect of the present invention.

FIG. 5 illustrates a diagram 110 for adaptively indicating field and frame encoding on a per slice basis in accordance with one non-limiting aspect of the present invention. The diagram 110 illustrates a portion of a bitstream transmitted in accordance with the HEVC Recommendation H.265 having a VPS, SPS, first and second PPSs and first and second coded pictures, similar to those described above with respect to FIG. 3. The first and second PPSs, unlike FIG. 3 and as shown with corresponding first and second callouts, may include only a portion of the adaptive syntaxes. The portion may be include which is necessary to indicate whether adaptive frame and field encoding is active, i.e., the aff syntax. The contemplated per slice identification of frame and field encoding may be provided by inserting the remainder of the adaptive syntaxes to slice segment headers of independent slice segments, i.e., sliced segments representing a beginning of a corresponding slice. The slice segment header callouts for each of the independent slice segments are shown to include the field and tff syntaxes for field encoded slice segments and only the field syntax for framing coded slice segments. The slice segment header callouts for each of the dependent slice segments are shown to include only the HEVC syntaxes, i.e., the non-adaptive syntaxes.

The adaptive syntax added to the slice segment headers may be varied on a per slice basis using the contemplated slice adaptive mode. This may be beneficial in enabling each slice segment associated with the same slice to be commonly identified as frame or field encoded without having to add corresponding identifications to the individual slice segments, i.e., each slice segment within a single slice may be identified using adaptive syntaxes added to the corresponding independent slice segment header. The slice adaptive identification may be beneficial over the above described picture adaptive identification in scenarios in which the encoder 12 may separately encode slices from the same picture as field and frame, i.e., when the encoder 12 intermixes field and frame slices within the same picture encoding. The encoder 12 may desire to intermix field and frame encoded slices in order to take advantage of enhanced compression capabilities associated with individually encoding slices as fields and frames. As with the picture adaptive process described above, the slice adaptive process may enable per picture variations such that adjoining pictures or pictures next to each other may include different patterns or sequences of identified field and frame encodings for the slices associated therewith, i.e., enabling adjoining pictures to identify field and frame slices differently.

Figure 6:
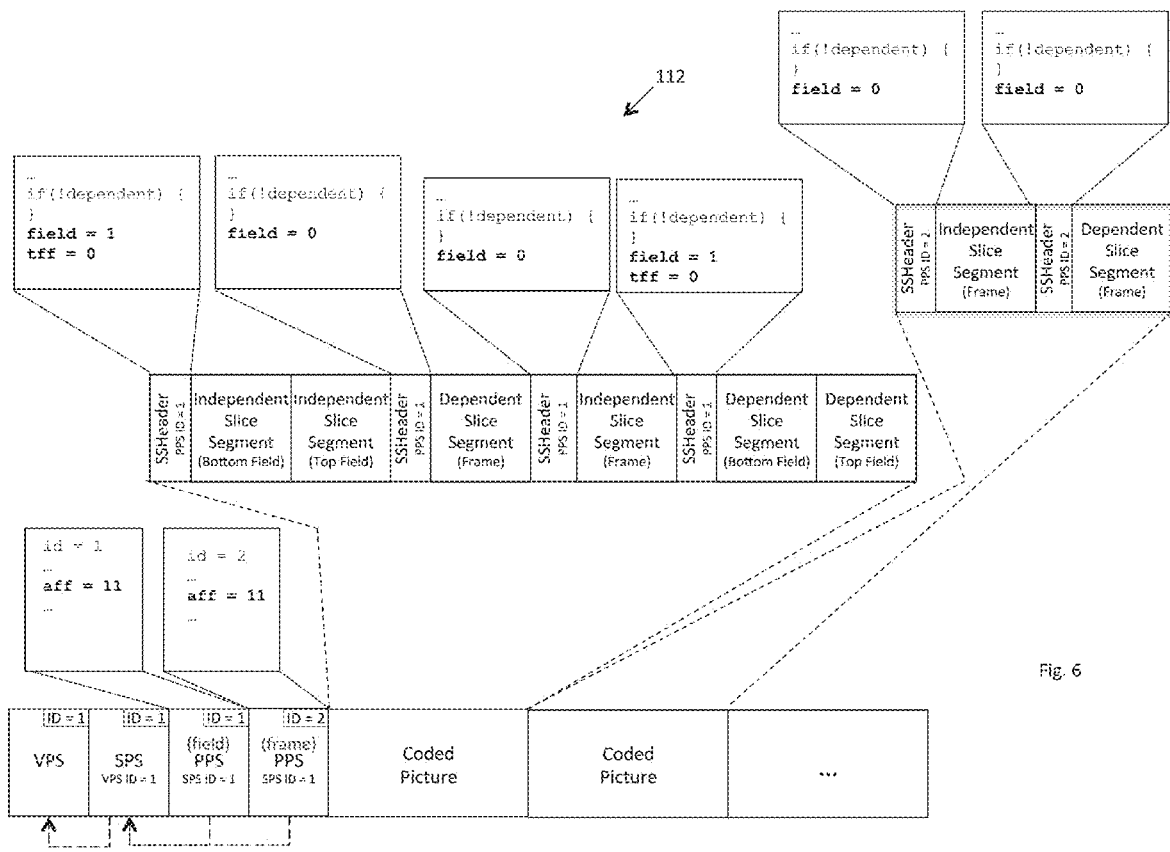
FIG. 6 illustrates a diagram for adaptively indicating field and frame encoding on a per slice segment basis in accordance with one non-limiting aspect of the present invention.

FIG. 6 illustrates a diagram 112 for adaptively indicating field and frame encoding on a per slice segment basis in accordance with one non-limiting aspect of the present invention. The diagram 112 illustrates a portion of a bitstream transmitted in accordance with the HEVC Recommendation H.265 having a VPS, SPS, first and second PPSs and first and second coded pictures, similar to those described above with respect to FIGS. 3 and 5. The first and second PPSs, as in FIG. 5 and as shown with corresponding first and second callouts, may include only a portion of the adaptive syntaxes necessary to indicate whether adaptive frame and field encoding is active, i.e., the aff syntax. The contemplated per slice segment identification of frame and field encoding may be provided by inserting the remainder of the adaptive syntaxes within slice segment headers of independent and dependent slice segments. The slice segment header callouts for each of the independent slice segments are shown to include the field and tff syntaxes for field encoded slice segments and only the field syntax for framing coded slice segments. The slice segment adaptive identification may share many of the benefits of the above-described slice adaptive identification and itself provide additional benefits by enabling field and frame identification at a more granular level such that independent and dependent slice segments may be separately identified and encoded as field and frame.

The adaptive syntax added to the independent and dependent slice segment headers are shown to be aligned in a leftward portion of the corresponding callouts in order to highlight that the added syntaxes are outside of the "if" statements defined with in HEVC for independent and dependent sliced segments. This alignment is in contrast to the adaptive syntax added to the independent slice segment headers of those associated with the slice adaptive process illustrated in FIG. 5, which are considered to fall within the "if" statements as the corresponding syntax only applies to independent slice segment headers. The positioning of the syntax for the slice adaptive process may correspond with insertions between "entry_point_offset_minus1" and "if(slice_segment_header_extension_present_flag" as defined in HEVC. The positioning of the syntax for the slice segment adaptive process may correspond with insertions between "if(slice_segment_header_extension_present_flag)" and "byte_alignment". Of course and as noted, the positioning of the adaptive syntax contemplated by the present invention and the format associated therewith are provided for exemplary non-limiting purposes as other syntax and positioning may be employed without deviating from the scope and contemplation of the present invention.

As supported above, one non-limiting aspect of the present invention relates to introducing new signaling in the Picture PPS syntax element that indicates whether a given input picture is to be decoded as a field or frame and (when a field) whether that field is a top or bottom field. The bitstream can signal two different PPS instances (one for field coding and one for frame coding) and the Slice Segment Headers for each slice for a particular picture can reference one PPS or the other based on whether it should be field or frame coded. The new PPS signaling indicates whether field coding is used and whether the current picture is the top field or bottom field. The present invention opens the door for even finer-grain control of frame/field coding in what may be referred to as SLAFF (SLice Adaptive Frame Field) coding. A decoded picture buffer may operate accordingly by holding pictures that can be used as references for inter prediction of samples. For interlace support, each decoded picture would be allocated to hold a full frame (both top and bottom fields), similar to progressive coding. However, it is possible that only samples with y (vertical) values that are even or odd will be present at the time of referencing (since only one of the fields has been handled). The capabilities noted herein may enable much of the content created and distributed in interlace format to be supported within in HEVC to produce lower bitrates and higher quality video and/or to provide a higher degree of flexibility to encoders when selecting a method for encoding an individual picture. With this feature, encoders will be able to measure the actual bitrate savings of encoding a frame versus two fields and pick the one with more cost reduction (for Picture Adaptive Frame Field (PAFF)). With SLAFF, encoders will have the ability to identify localized areas of motion within a single picture and choose frame/field coding based on the contents of an individual slice.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for adaptively indicating field and frame encoding of coded pictures, each coded picture including one or more slices, one or more slice segments and one or more slice segment headers, the method comprising:
   encoding an adaptive field frame (aff) syntax within at least a plurality of picture parameter sets (PPSs), the aff syntax indicating one of picture adaptive, slice adaptive and slice segment adaptive field and frame encoding for one or more coded pictures referred thereto; and
   encoding the aff syntax as a two-bit syntax sufficient to uniquely indicate the picture adaptive, slice adaptive and slice segment adaptive field and frame encoding.

2. The method of claim 1 further comprising encoding a field syntax within each PPS having the aff syntax indicating picture adaptive field and frame encoding, the field syntax indicating each slice segment referred thereto as being encoded as one of field and frame.

3. The method of claim 2 further comprising encoding a top field first (tff) syntax within each PPS having the field syntax indicating picture adaptive field encoding, the tff syntax indicating each slice segment referred thereto as being encoded as one of top field first and bottom field first.

4. The method of claim 3 further comprising encoding the field syntax with a bit value of 0 to indicate frame encoding and with a bit value of 1 to indicate field encoding and encoding the tff syntax with a bit value of 0 to indicate bottom field first encoding and with a bit value of 1 to indicate top field first encoding.

5. The method of claim 3 further comprising encoding each PPS having the aff syntax indicating picture adaptive frame encoding without the tff syntax.

6. The method of claim 3 further comprising encoding each slice segment header referring to one of the PPSs having the aff syntax indicating picture adaptive field and frame encoding without the field and tff syntaxes.

7. The method of claim 1 further comprising:
   encoding each slice segment to be one of independent and dependent; and
   encoding a field syntax within each independent slice segment header referring to one of the PPSs having the aff syntax indicating slice adaptive field and frame encoding, the field syntax indicating each slice segment referred thereto as being encoded as one of field and frame.

8. The method of claim 7 further comprising encoding a top field first (tff) syntax within each independent slice segment header referring to one of the PPSs having the field syntax indicating slice adaptive field encoding, the tff syntax indicating each slice segment referred thereto as being encoded as one of top field first and bottom field first.

9. The method of claim 8 further comprising encoding the field syntax with a bit value of 0 to indicate frame encoding and with a bit value of 1 to indicate field encoding and encoding the tff syntax with a bit value of 0 to indicate bottom field first encoding and with a bit value of 1 to indicate top field first encoding.

10. The method of claim 8 further comprising encoding each PPS having the aff syntax indicating slice adaptive frame encoding without the field and tff syntaxes.

11. The method of claim 8 further comprising encoding each dependent slice segment header referring to one of the PPSs having the aff syntax indicating slice adaptive field and frame encoding without the field and tff syntaxes.

12. The method of claim 1 further comprising:
   encoding a field syntax within each slice segment header referring to one of the PPSs having the aff syntax indicating slice segment adaptive field and frame encoding, the field syntax indicating each slice segment referred thereto as being encoded as one of field and frame.

13. The method of claim 12 further comprising encoding a top field first (tff) syntax within each slice segment header referring to one of the PPSs having the field syntax indicating slice segment adaptive field encoding, the tff syntax indicating each slice segment referred thereto as being encoded as one of top field first and bottom field first.

14. The method of claim 13 further comprising encoding the field syntax with a bit value of 0 to indicate frame encoding and with a bit value of 1 to indicate field encoding and encoding the tff syntax with a bit value of 0 to indicate bottom field first encoding and with a bit value of 1 to indicate top field first encoding.

15. The method of claim 12 further comprising encoding each PPS having the aff syntax indicating slice segment adaptive frame encoding without the field and tff syntaxes.

16. The method of claim 1 further comprising encoding the two-bit syntax as 01 to indicate picture adaptive field and frame encoding, as 10 to indicate slice adaptive field and frame encoding and as 11 to indicate slice segment adaptive field and frame encoding.

17. A non-transitory computer-readable medium having instructions, operable with a processor, to facilitate decoding coded pictures transmitted within a bitstream, each coded picture including one or more slices, one or more slice segments and one or more slice segment headers, the computer-readable medium comprising instructions sufficient for:
   processing an adaptive field frame (aff) syntax included within picture parameter sets (PPSs) transmitted within the bitstream; and
   determining slice segments referring to the PPSs as frames or as fields according to:
   i) a field syntax included within the PPS if the aff syntax of the referred to PPS indicates picture adaptive encoding;

ii) a field syntax included within a slice segment header of an associated independent slice segment if the aff syntax of the referred to PPS indicates slice adaptive encoding; and iii) a field syntax included within a slice segment header of an associated dependent slice segment if the aff syntax of the referred to PPS indicates slice segment adaptive encoding.

18. A non-transitory computer-readable medium having a plurality of non-transitory instructions, which when executed with a processor of an encoder, are sufficient for adaptively indicating field and frame encoding of coded pictures having one or more slices, one or more slice segments and/or one or more slice segment headers, the non-transitory instructions being sufficient for:

encoding an adaptive field frame (aff) syntax within at least a plurality of picture parameter sets (PPSs) associated with the coded pictures, the aff syntax indicating one of picture adaptive, slice adaptive and slice segment adaptive field and frame encoding for one or more coded pictures referred thereto; and encoding the aff syntax as a two-bit syntax sufficient to uniquely indicate the picture adaptive, slice adaptive and slice segment adaptive field and frame encoding.

19. The non-transitory computer-readable medium of claim 18 further comprising the plurality of non-transitory instructions being sufficient for:

encoding a field syntax within each slice segment header referring to one of the PPSs having the aff syntax indicating slice segment adaptive field and frame encoding, the field syntax indicating each slice segment referred thereto as being encoded as one of field and frame;

encoding a top field first (tff) syntax within each slice segment header referring to one of the PPSs having the field syntax indicating slice segment adaptive field encoding, the tff syntax indicating each slice segment referred thereto as being encoded as one of top field first and bottom field first; and encoding each PPS having the aff syntax indicating slice segment adaptive frame encoding without the field and tff syntaxes.

20. The non-transitory computer-readable medium of claim 19 further comprising the plurality of non-transitory instructions being sufficient for encoding the two-bit syntax as 01 to indicate picture adaptive field and frame encoding, as 10 to indicate slice adaptive field and frame encoding and as 11 to indicate slice segment adaptive field and frame encoding.

* * * * *